No. 881,201. PATENTED MAR. 10, 1908.
L. G. SCHLENK.
REIN PROTECTOR.
APPLICATION FILED SEPT. 9, 1907.

Witnesses:
C. B. Clark
E. Behel.

Inventor:
Leonard G. Schlenk
By A. O. Behel
Atty.

UNITED STATES PATENT OFFICE.

LEONARD G. SCHLENK, OF ROCKFORD, ILLINOIS.

REIN-PROTECTOR.

No. 881,201. Specification of Letters Patent. Patented March 10, 1908.

Application filed September 9, 1907. Serial No. 392,025.

*To all whom it may concern:*

Be it known that I, LEONARD G. SCHLENK, a citizen of the United States, residing at Rockford, in the county of Winnebago and State of Illinois, have invented certain new and useful Improvements in Rein-Protectors, of which the following is a specification.

The object of this invention is to provide means for preventing a horse throwing its tail over the reins.

This invention consists of a net secured with relation to the upper portion of a horse's tail so that it will be elevated when the horse elevates its tail and over which the reins rest when driving the horse.

Figure 1:
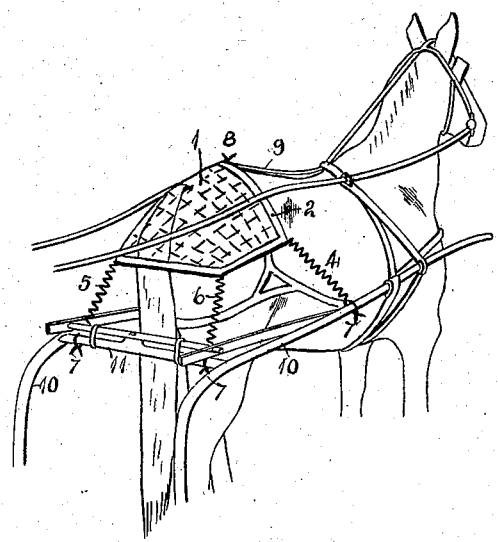
Figure 2:
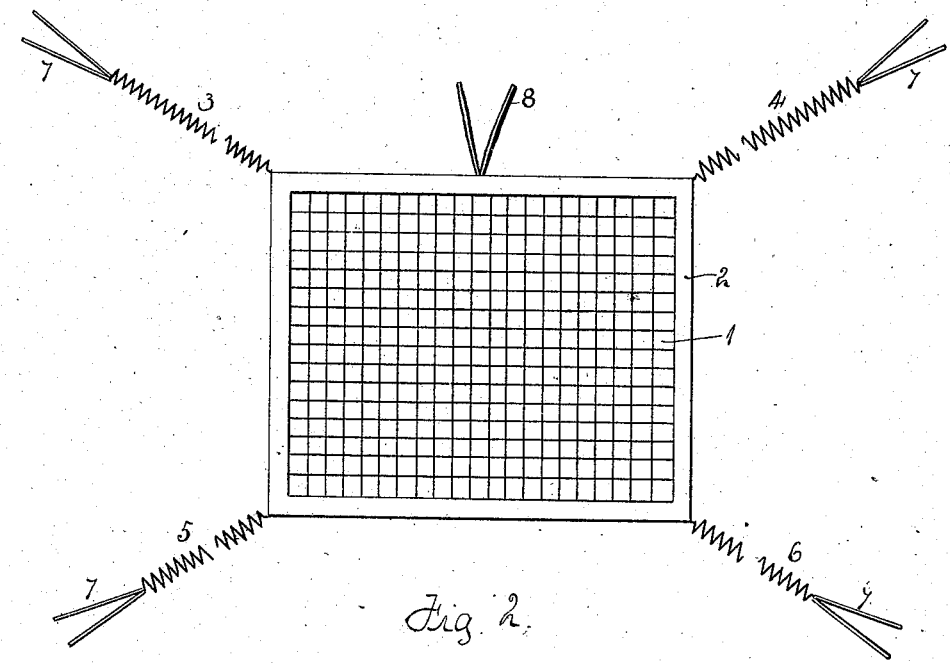

In the accompanying drawings. Figure 1 shows the application of my improved rein protector to a horse. Fig. 2 is an outstretched view of the rein protector.

The protector 1 in this instance is made of netting, but can be made of any suitable material, netting is employed because of its lightness, and being open work will admit of the circulation of air. An edging 2 is formed around the protector to give the same the proper shape.

To each of the four corners of the protector is secured a spiral spring 3, 4, 5 and 6. To the free end of each spring is secured a connecting device, in this instance, a tape 7.

Fig. 1 shows the application of my improved rein protector to a horse. A tape 8 secured to the edging 2 is tied to the back strap 9 of the harness.

The springs 3 and 4 connected to the forward corners of the edging are connected to the shafts 10 of the buggy, and the springs 5 and 6 connected to the rear corners of the edging are connected to the cross bar 11.

When the rein protector is thus connected, it will extend some distance from the root of the horse's tail, and will be held yieldingly in position, so that the horse can have full freedom in the use of its tail.

The reins rest upon the rein protector, and when the horse elevates its tail, the rein protector will be elevated which will raise the reins, thereby preventing the reins getting under the horse's tail.

This rein protector can be readily connected to any horse.

I claim as my invention.

The combination of a rein protector, a spring connected to each of the four corners of the protector, a fastening device connected to the free end of each spring, and a fastening device connected to the protector between two of the springs.

In testimony whereof I have hereunto set my hand in presence of two subscribing witnesses.

LEONARD G. SCHLENK.

Witnesses:
A. O. BEHEL,
E. D. E. N. BEHEL.